(12) United States Patent
Zhao

(10) Patent No.: US 12,185,865 B2
(45) Date of Patent: Jan. 7, 2025

(54) METHOD AND APPARATUS FOR HIGH YIELD FOAMING OF COFFEE

(71) Applicant: MAKETUBE S.r.l., Fermo (IT)

(72) Inventor: Feng Zhao, Guangdong (CN)

(73) Assignee: MAKETUBE S.r.l (IT)

( * ) Notice: Subject to any disclaimer, the term of this patent is extended or adjusted under 35 U.S.C. 154(b) by 860 days.

(21) Appl. No.: 17/275,489

(22) PCT Filed: Aug. 23, 2019

(86) PCT No.: PCT/CN2019/102105
§ 371 (c)(1),
(2) Date: Mar. 11, 2021

(87) PCT Pub. No.: WO2020/057320
PCT Pub. Date: Mar. 26, 2020

(65) Prior Publication Data
US 2021/0307554 A1   Oct. 7, 2021

(30) Foreign Application Priority Data

Sep. 17, 2018 (CN) .......................... 201811080180.3

(51) Int. Cl.
*A47J 31/44* (2006.01)
*A23F 5/26* (2006.01)
(Continued)

(52) U.S. Cl.
CPC ............. *A47J 31/3676* (2013.01); *A23F 5/26* (2013.01); *A47J 31/005* (2013.01);
(Continued)

(58) Field of Classification Search
CPC ........ A47J 31/4496; A47J 31/32; A47J 31/30; A47J 31/36; A47J 31/24
See application file for complete search history.

(56) References Cited

U.S. PATENT DOCUMENTS

2006/0230946 A1* 10/2006 Cheng .................... A47J 31/32
99/300
2008/0302252 A1* 12/2008 O'Brien .................. A47J 31/32
99/302 R (Continued)

FOREIGN PATENT DOCUMENTS

| CN | 1681424 A | 10/2005 |
|----|-----------|---------|
| CN | 200951017 Y | 9/2007 |

(Continued)

*Primary Examiner* — Reginald Alexander
(74) *Attorney, Agent, or Firm* — Endurance Law Group PLC

(57) ABSTRACT

An apparatus for high yield foaming of coffee has a pressure control mechanism, a gas pressure source, a water reservoir and a back pressure resonance mechanism, wherein a coffee outlet is arranged at a lower part of the back pressure resonance mechanism. When a button is pressed, water having a controlled water pressure enters a coffee placement cavity to be mixed with the coffee and extracted. One resonance needle and a colloid ring constitute a resonance cavity. When pressed coffee slurry passes through the resonance cavity, due to the pressed coffee slurry and a special structure of the resonance cavity, the coffee slurry is sufficiently foamed after high-frequency oscillation and flows out of the coffee outlet.

9 Claims, 4 Drawing Sheets

(51) Int. Cl.
*A47J 31/00* (2006.01)
*A47J 31/32* (2006.01)
*A47J 31/36* (2006.01)
*A47J 31/24* (2006.01)

(52) U.S. Cl.
CPC ....... *A47J 31/4403* (2013.01); *A47J 31/4496* (2013.01); *A47J 31/24* (2013.01)

(56) References Cited

U.S. PATENT DOCUMENTS

| | | | |
|---|---|---|---|
| 2010/0011966 A1* | 1/2010 | Nielsen | A47J 31/38 99/302 R |
| 2013/0133524 A1* | 5/2013 | Vastardis | A47J 31/32 99/300 |

FOREIGN PATENT DOCUMENTS

| | | |
|---|---|---|
| CN | 102397012 A | 4/2012 |
| CN | 103479224 A | 1/2014 |
| CN | 104172927 A | 12/2014 |
| CN | 107581908 A | 1/2018 |
| CN | 108852004 A | 11/2018 |
| CN | 209346697 U | 9/2019 |
| WO | WO2017144996 A | 8/2017 |

\* cited by examiner

METHOD AND APPARATUS FOR HIGH YIELD FOAMING OF COFFEE

TECHNICAL FIELD

The invention relates to a coffee maker manufacturing technology, in particular to a method and an apparatus for high yield foaming of coffee.

BACKGROUND ART

In the prior art, in order to make the brewed coffee generate enough foam, a plurality of innovations are carried out, and a plurality of patented technologies are generated, which are listed as examples in the following.

In patent No. ZL 200620008268.0, Chinese Utility Model Patent entitled coffee foaming device, an outlet valve core thereof belongs to the traditional structure for applying pressure to eject coffee, wherein a foaming effect is generated, but a foaming efficiency is not high.

Furthermore, patent No. 200920193566.5, Chinese utility model patent entitled coffee foaming device of coffee maker, is based on the principle that a water outlet nozzle sprays coffee slurry onto a filter screen, and the coffee slurry is sufficiently fused with air to foam, wherein although the foaming effect is achieved, the foaming efficiency is still not high.

Furthermore, patent No. 201120033697.4, Chinese Utility Model Patent entitled coffee foaming device, is still based on the principle that the conventional water outlet nozzle sprays the coffee slurry onto a wall of a container to foam, wherein although the foaming effect is achieved, the foaming efficiency is still not high.

In view of the fact that the above-mentioned patented technologies all belong to generation of coffee foam by means of high-temperature steam pressurized injection, no attempt has been made to use the principle that the string or reed of a musical instrument oscillates to produce sound, and the principle that any cavity has its own resonant frequency while any needle-shaped object or diaphragm object also has its own resonant frequency, to test the oscillation and foaming of coffee.

SUMMARY OF THE INVENTION

Technical Problem

Solutions to the Problem

Technical Solutions

The invention aims to solve the problem that in the prior art, coffee foaming is mostly performed by adopting a high-pressure steam spraying and sputtering principle, and the foaming effect is poor, while on the premise that a pressure power source with a specific pressure is externally applied, a specific resonance element and a specific configuration are designed in trials by the applicant of the present application, so that coffee slurry is oscillatingly atomized under the action therein, and the foaming rate is doubled.

The invention is realized by adopting the following technical solutions.

A method for high yield foaming of coffee, comprising:
in a first step, providing a pressure control mechanism connected with a gas pressure source at an inlet of the pressure control mechanism and connected with a water reservoir at an outlet of the pressure control mechanism, brewing water being contained in the water reservoir, a coffee placement cavity being arranged below the water reservoir, with a bag of coffee placed in the coffee placement cavity, a back pressure resonance mechanism being arranged below the coffee placement cavity, and a coffee outlet being arranged at a lower part of the back pressure resonance mechanism;
in a second step, then pressing down a button, the pressure control mechanism decompressing high-pressure gas of the gas pressure source to a gas having a brewing pressure which enters the water reservoir, water having the brewing pressure then entering the coffee placement cavity to be mixed with the coffee and extracted;
in a third step, coffee slurry then entering the back pressure resonance mechanism, first arrival coffee slurry flowing down from a guide hole of a guide plate and entering an annular space, at the moment a cartridge bottom surface of a back pressure cartridge being pressed by a colloid ring, one resonance needle being arranged and placed on the cartridge bottom surface, a resonance groove being arranged at a contact position of the colloid ring with the resonance needle, the resonance groove being buckled on the resonance needle to constitute a resonance cavity, when the coffee slurry having the brewing pressure passes through the resonance cavity, due to the brewing pressure and a special structure of the resonance cavity, the coffee slurry having the brewing pressure being sufficiently foamed after high-frequency oscillation and flowing out of the coffee outlet.

In the third step, when the guide plate is embedded into the back pressure cartridge, a guide plate periphery is matched with an upper inner circular wall of the back pressure cartridge.

In the third step, a lower circular boss is arranged at a lower part of the guide plate and used for clamping a central circular hole of the colloid ring and positioning the colloid ring, and a lower inner circular wall of the back pressure cartridge and a colloid ring outer edge of the colloid ring together constitute an annular space.

In the second step the brewing pressure is 6-8 bar in a portable coffee maker and 9-11 bar in a domestic or desktop machine.

An apparatus for high yield foaming of coffee is designed and manufactured, wherein the apparatus comprises a pressure control mechanism connected with a gas pressure source at an inlet of the pressure control mechanism and connected with a water reservoir at an outlet of the pressure control mechanism, a coffee placement cavity being arranged below the water reservoir, a back pressure resonance mechanism being arranged below the coffee placement cavity, and a coffee outlet being arranged at a lower part of the back pressure resonance mechanism.

The pressure control mechanism is provided with a button, when the button is pressed down, the pressure control mechanism decompressing high-pressure gas to a gas having a brewing pressure which enters the water reservoir, water having the brewing pressure then entering the coffee placement cavity to be mixed with the coffee and extracted, the brewing pressure being 6-8 bar in a portable coffee maker and 9-11 bar in a domestic or desktop machine.

The back pressure resonance mechanism comprises a guide plate with guide holes distributed on the guide plate circumferentially, with the guide holes communicated with an annular space, the back pressure resonance mechanism further comprising a back pressure cartridge, with a cartridge bottom surface of the back pressure cartridge pressed by a colloid ring;

one resonance needle being arranged on the cartridge bottom surface, a resonance groove being arranged at a contact position of the colloid ring with the resonance needle, the resonance groove being buckled on the resonance needle, with a resonance cavity constituted between the resonance groove and the resonance needle, when the coffee slurry having the brewing pressure passes through the resonance cavity, due to the brewing pressure and a special structure of the resonance cavity, the coffee slurry having the brewing pressure being sufficiently foamed after high-frequency oscillation and flowing out of the coffee outlet.

When the guide plate is embedded into the back pressure cartridge, a guide plate periphery is matched with an upper inner circular wall of the back pressure cartridge; and a lower circular boss is arranged at a lower part of the guide plate and used for clamping a central circular hole of the colloid ring and positioning the colloid ring, and a lower inner circular wall of the back pressure cartridge and a colloid ring outer edge of the colloid ring together constitute an annular space.

A lower part of the water reservoir is provided with a water reservoir lock catch which is buckled with a back pressure lock catch on a back pressure shell of the back pressure resonance mechanism, a coffee bag being locked on the coffee placement cavity;

the coffee placement cavity is supported by a placement cavity tray, and a coffee slurry space below the placement cavity tray stores the coffee slurry flowing down from a coffee slurry through hole.

An outlet filter screen and a splash-proof port are arranged at the coffee outlet to enable the coffee slurry flowing out from a slurry outlet to sequentially flow into a coffee cup, a pressure control mechanism cover plate being arranged on top of the pressure control mechanism;

a back pressure cartridge sealing ring is arranged between the back pressure cartridge and the back pressure shell; and a guide plate filter screen is arranged on the guide plate.

The gas pressure source comprises carbon dioxide and high-pressure steam. If a water pump used for pressurizing drinking water commonly used in the market is adopted, the gas pressure source, the pressure control mechanism and the water reservoir are combined, which is also suitable for the apparatus for high yield foaming. The structure at this point is that the gas pressure source, the pressure control mechanism, and the water reservoir are combined and pressurized by a water pump, and pumped water enters the coffee placement cavity.

Pocket-sized carbon dioxide gas tank has a smallest volume, is suitable for a portable coffee maker, and has no noise generation relative to a water pump.

In addition, use of carbon dioxide has the advantage that coffee taste results from the carbon dioxide gas content produced after coffee beans are roasted.

Advantageous Effects of the Invention

Advantageous Effects

The invention has the advantages that the water temperature of the brewed coffee is not required, and of course, the taste of the coffee brewed by high-temperature water is better. Moreover, the structure of the present invention is small in occupied space and can be applied to coffee makers of any size, and the coffee made by the method and structure of the present invention can reach 70 percent of coffee foam.

BRIEF DESCRIPTION OF THE DRAWINGS

The invention will now be further described with reference to the accompanying drawings, in which embodiments are not intended to limit the invention in any way.

DETAILED DESCRIPTION OF THE INVENTION

The invention will now be described with reference to specific implementations.

Figure 1:
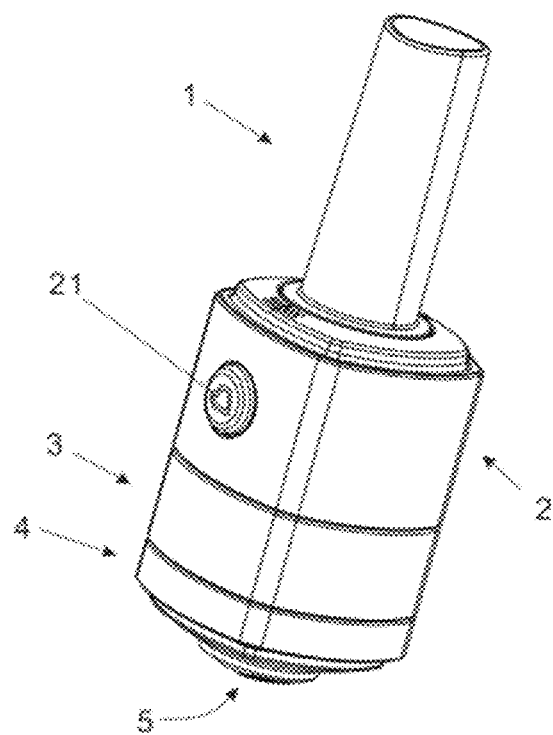
FIG. 1 is a schematic view of an overall form of one of the embodiments of a method and an apparatus for high yield foaming of coffee according to the present invention.
Figure 2:
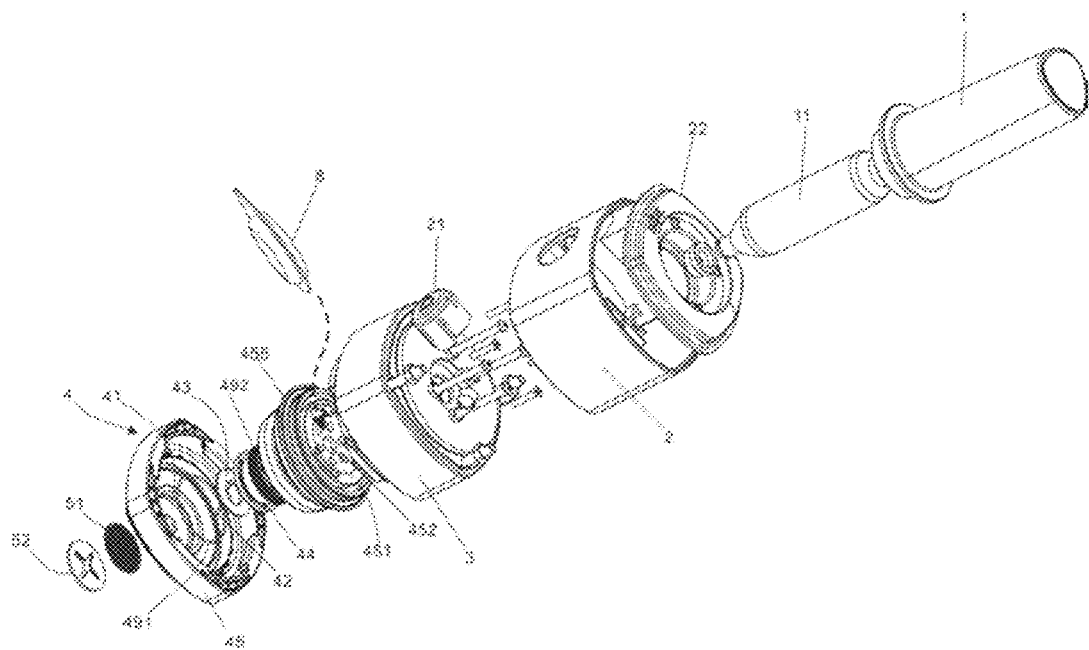
FIG. 2 is a schematic view observed in one direction of an overall explosive decomposition of one of the embodiments of the method and the apparatus for high yield foaming of coffee of the present invention.
Figure 3:
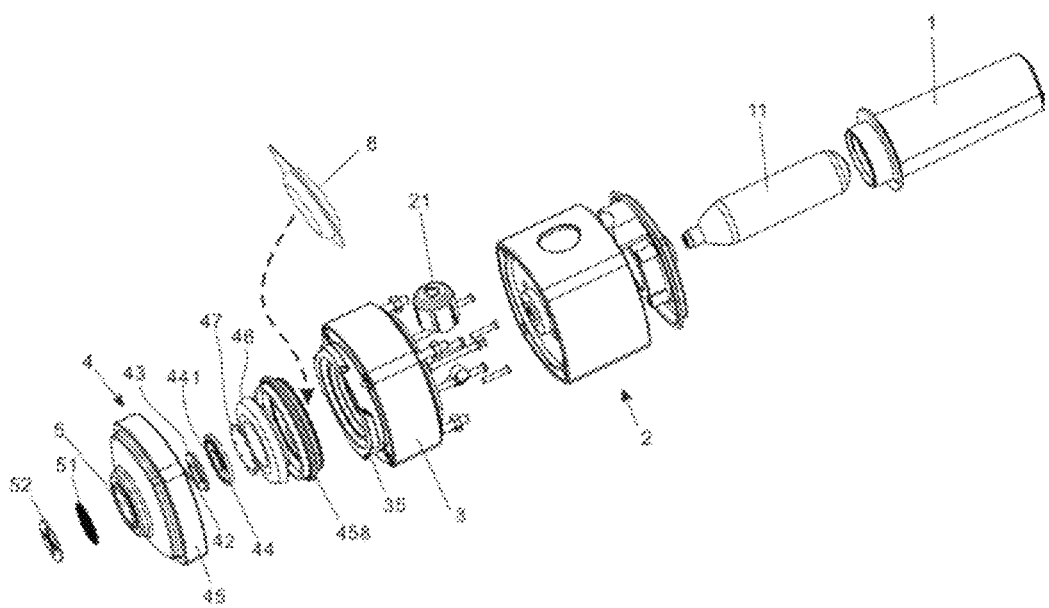
FIG. 3 is a schematic view observed from another direction of the overall exploded decomposition of one of the embodiments of the method and the apparatus for high yield foaming of coffee of the present invention.
Figure 8:
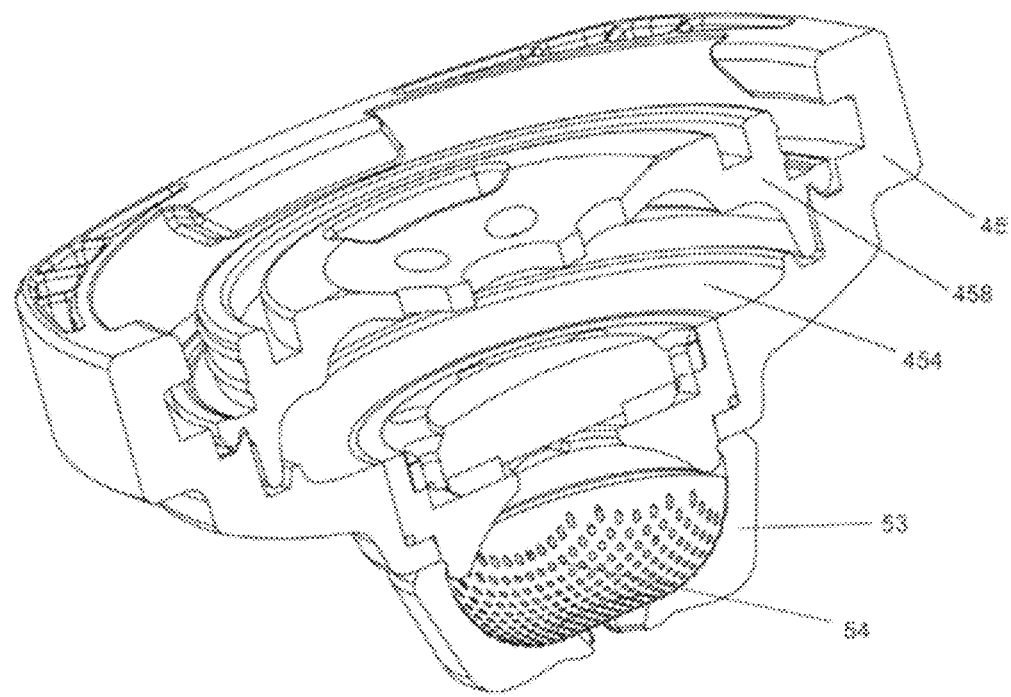
FIG. 8 is a schematic view of the structure of a second embodiment of a coffee outlet 5 of the method and the apparatus for high yield foaming of coffee according to the invention.

As shown in FIGS. 1 and 8, the method for high yield foaming of coffee comprises the following steps.

In a first step, at first a pressure control mechanism 2 is provided which is connected with a gas pressure source 11 at an inlet of the pressure control mechanism 2 and connected with a water reservoir 3 at an outlet of the pressure control mechanism 2, brewing water is contained in the water reservoir 3, a coffee placement cavity 451 is arranged below the water reservoir 3, with a bag of coffee placed in the coffee placement cavity 451, a back pressure resonance mechanism 4 is arranged below the coffee placement cavity 451, and a coffee outlet 5 is arranged at a lower part of the back pressure resonance mechanism 4.

In a second step, then a button 21 is pressed down, the pressure control mechanism 2 decompresses high-pressure gas of the gas pressure source 11 to a gas having a brewing pressure which enters the water reservoir 3, and water having the brewing pressure then enters the coffee placement cavity 451 to be mixed with the coffee and extracted.

In a third step, coffee slurry then enters the back pressure resonance mechanism 4, first arrival coffee slurry flows down from a guide hole 443 of a guide plate 44 and enters an annular space 444, at the moment a cartridge bottom surface 401 of a back pressure cartridge 40 is pressed by a colloid ring 43, one resonance needle 42 is arranged and placed on the cartridge bottom surface 401, a resonance groove 431 is arranged at a contact position of the colloid ring 43 with the resonance needle 42, the resonance groove 431 is buckled on the resonance needle 42 to constitute a resonance cavity 425, and when the coffee slurry having the brewing pressure passes through the resonance cavity 425, due to the brewing pressure and a special structure of the resonance cavity 425, the coffee slurry having the brewing pressure is sufficiently foamed after high-frequency oscillation and flows out of the coffee outlet 5.

In the third step, when the guide plate 44 is embedded into the back pressure cartridge 40, a guide plate periphery 442 is matched with an upper inner circular wall 403 of the back pressure cartridge 40.

In the third step, a lower circular boss 441 is arranged at a lower part of the guide plate 44 and used for clamping a central circular hole of the colloid ring 43 and positioning the colloid ring 43, and a lower inner circular wall 402 of the back pressure cartridge 40 and a colloid ring outer edge 432 of the colloid ring 43 together constitute an annular space 444.

In the second step the brewing pressure is 6-8 bar in a portable coffee maker and 9-11 bar in a domestic or desktop machine.

A further implementation method of the invention is that the gas pressure source 11, the pressure control mechanism 2 and the water reservoir 3 are combined and pressurized by a water pump, the pressurized water enters the coffee placement cavity 451.

An apparatus for high yield foaming of coffee is designed and manufactured, wherein the apparatus comprises a pressure control mechanism 2 connected with a gas pressure source 11 at an inlet of the pressure control mechanism 2 and connected with a water reservoir 3 at an outlet of the pressure control mechanism 2, a coffee placement cavity 451 is arranged below the water reservoir 3, a back pressure resonance mechanism 4 is arranged below the coffee placement cavity 451, and a coffee outlet 5 is arranged at a lower part of the back pressure resonance mechanism 4.

The pressure control mechanism 2 is provided with a button 21, when the button 21 is pressed down, the pressure control mechanism 2 decompresses high-pressure gas to a gas having a brewing pressure which enters the water reservoir 3, and water having the brewing pressure then enters the coffee placement cavity 451 to be mixed with the coffee and extracted, wherein the brewing pressure is 6-8 bar in a portable coffee maker and 9-11 bar in a domestic or desktop machine.

The back pressure resonance mechanism 4 comprises a guide plate 44 with guide holes 443 distributed on the guide plate 44 circumferentially, with the guide holes 443 communicated with an annular space 444.

The back pressure resonance mechanism 4 further comprises a back pressure cartridge 40, with a cartridge bottom surface 401 of the back pressure cartridge (40) pressed by a colloid ring (43).

One resonance needle 42 is arranged on the cartridge bottom surface 401, a resonance groove 431 is arranged at a contact position of the colloid ring 43 with the resonance needle 42, and the resonance groove 431 is buckled on the resonance needle 42, with a resonance cavity 425 constituted between the resonance groove 431 and the resonance needle 42, and when the coffee slurry having the brewing pressure passes through the resonance cavity 425, due to the brewing pressure and a special structure of the resonance cavity 425, the coffee slurry having the brewing pressure is sufficiently foamed after high-frequency oscillation and flows out of the coffee outlet 5.

When the guide plate 44 is embedded into the back pressure cartridge 40, a guide plate periphery 442 is matched with an upper inner circular wall 403 of the back pressure cartridge 40; and a lower circular boss 441 is arranged at a lower part of the guide plate 44 and used for clamping a central circular hole of the colloid ring 43 and positioning the colloid ring 43.

A lower inner circular wall 402 of the back pressure cartridge 40 and a colloid ring outer edge 432 of the colloid ring 43 together constitute an annular space 444.

A lower part of the water reservoir 3 is provided with a water reservoir lock catch 35 which is buckled with a back pressure lock catch 453 on a back pressure shell 45 of the back pressure resonance mechanism 4, and a coffee bag 8 is locked on the coffee placement cavity 451.

The coffee placement cavity 451 is supported by a placement cavity tray 458, and a coffee slurry space 454 below the placement cavity tray 458 stores the coffee slurry flowing down from a coffee slurry through hole 452.

An outlet filter screen 51 and a splash-proof port 52 are arranged at the coffee outlet 5 to enable the coffee slurry flowing out from a slurry outlet 407 to sequentially flow into a coffee cup, and a pressure control mechanism cover plate 21 is arranged on top of the pressure control mechanism 2.

A back pressure cartridge sealing ring 491 is arranged between the back pressure cartridge 40 and the back pressure shell 45.

A guide plate filter screen 492 is arranged on the guide plate 44.

Another implementation of the invention is that the gas pressure source 11, the pressure control mechanism 2, and the water reservoir 3 are combined and pressurized by a water pump, and pumped water enters the coffee placement cavity 451.

The gas pressure source comprises carbon dioxide and high-pressure steam. If a water pump used for pressurizing drinking water commonly used in the market is adopted, the gas pressure source, the pressure control mechanism and the water reservoir are combined, which is also suitable for the apparatus for high yield foaming. The structure at this point is that the gas pressure source, the pressure control mechanism, and the water reservoir are combined and pressurized by a water pump, and pumped water enters the coffee placement cavity.

Pocket-sized carbon dioxide gas tank has a smallest volume, is suitable for a portable coffee maker, and has no noise generation relative to a water pump.

In addition, use of carbon dioxide has the advantage that coffee taste results from the carbon dioxide gas content produced after coffee beans are roasted.

Figure 4:
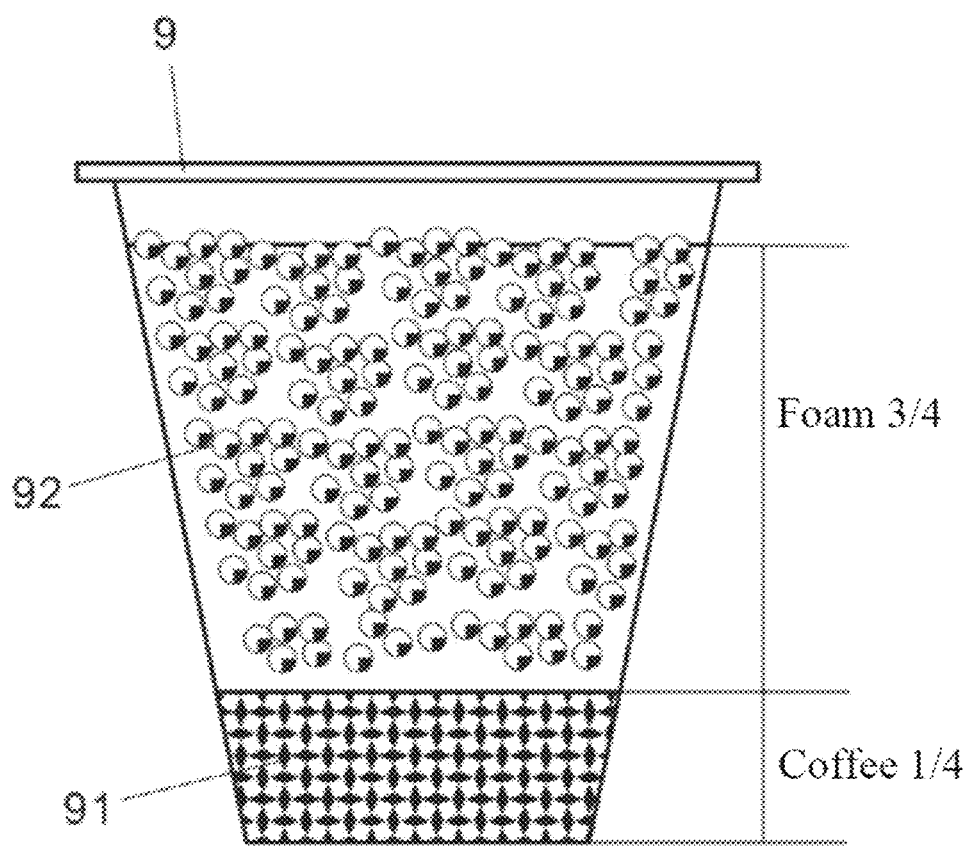
FIG. 4 is a schematic view of the method and the apparatus for high yield foaming of coffee according to the present invention when the coffee is brewed, wherein the foam accounts for more than 70%, the coffee slurry 91 is at the bottom of the cup 9 accounting for only a small part, and the foam 92 floats at the upper part of the cup accounting for a large part.
Figure 5:
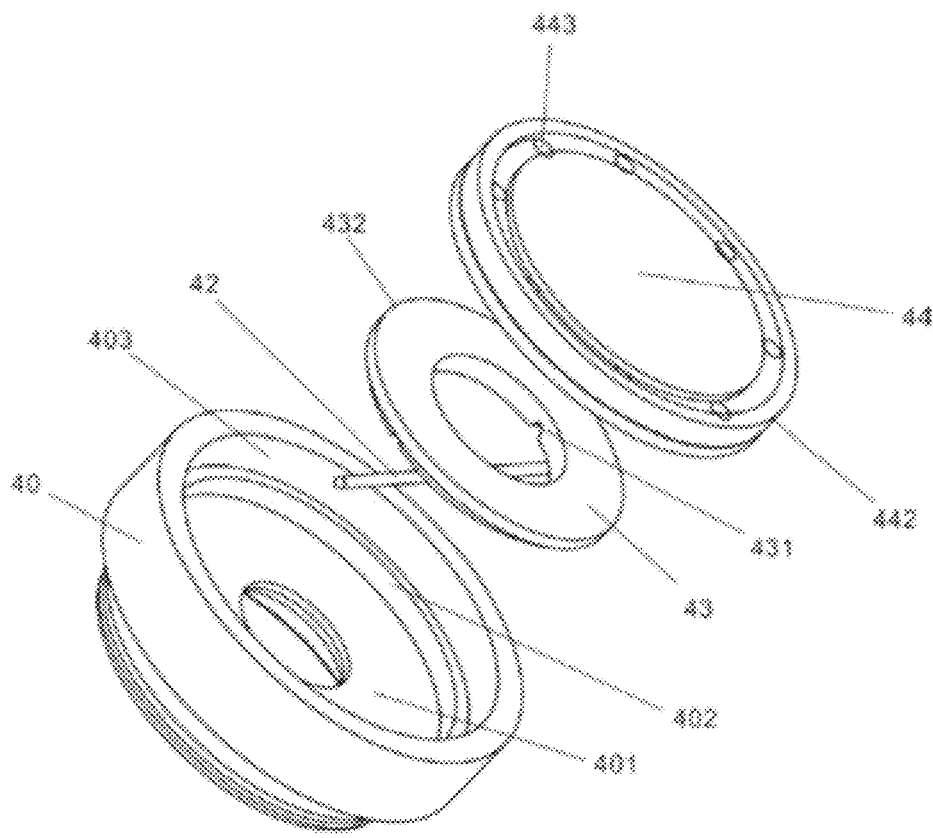
FIG. 5 is an exploded view of the a pressure cartridge 40, a colloid ring 43, a guide plate 44 and a resonance needle 42 of the method and the apparatus for high yield foaming of coffee of the present invention.
Figure 6:
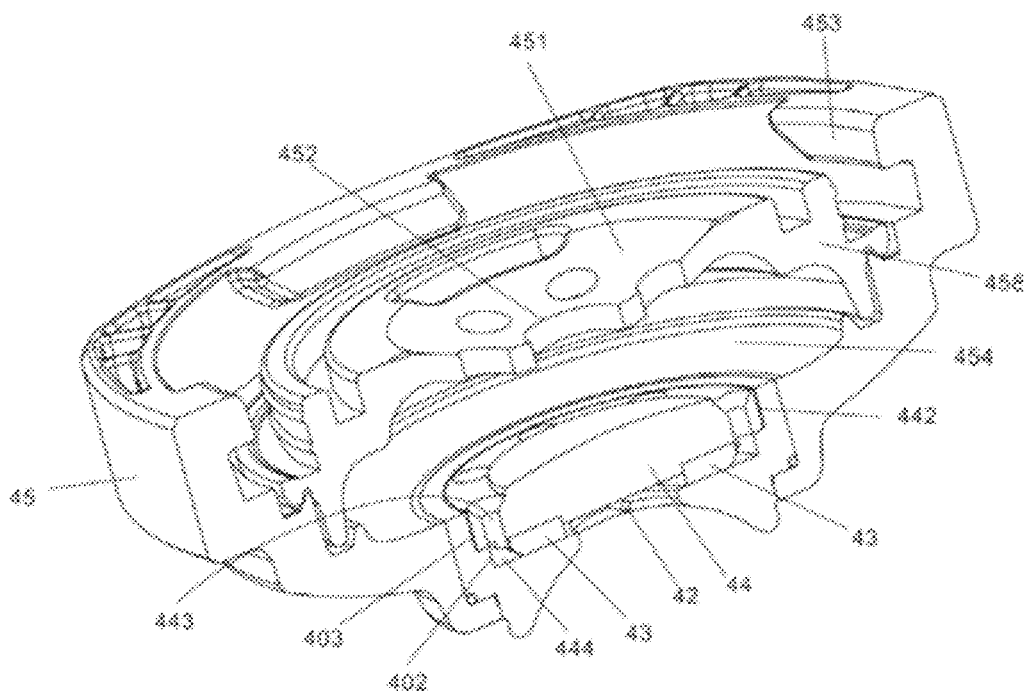
FIG. 6 is a schematic cross-sectional view of assembled colloid ring 43, guide plate 44, resonance needle 42, back pressure shell 45, placement cavity tray 458, coffee placement cavity 451, and coffee slurry space 454 of the method and the apparatus for high yield foaming of coffee of the present invention.

As can be seen from FIG. 4, with the present invention, high yield foaming can be produced, and with different outlet filter screens, foamed coffee with different tastes can be obtained.

Figure 7:
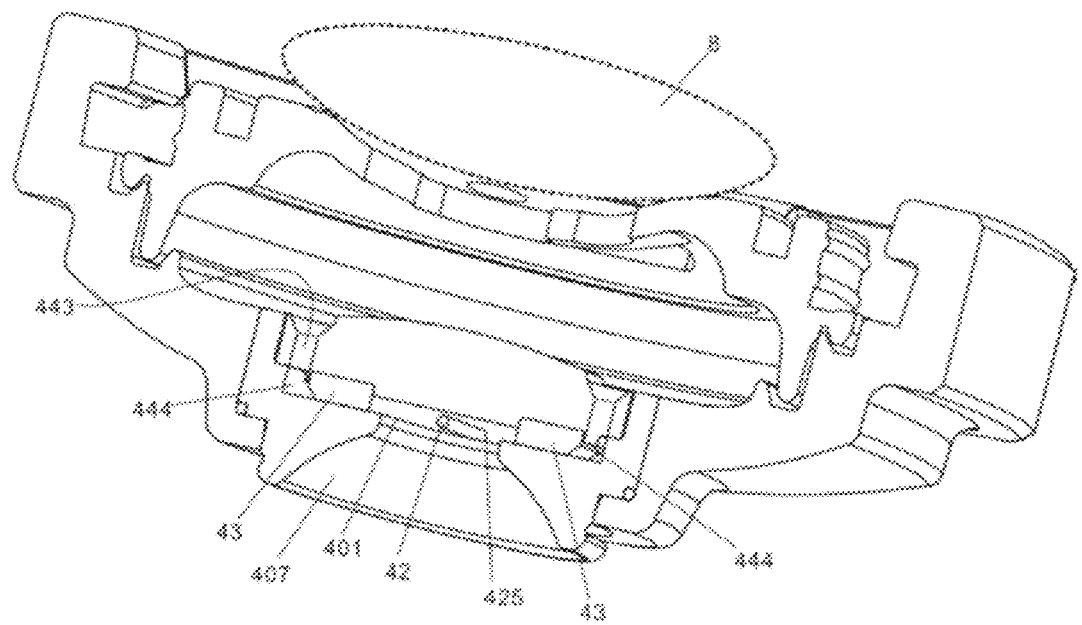
FIG. 7 is a schematic cross-sectional view of assembled colloid ring 43, guide plate 44, resonance needle 42, back pressure shell 45, placement cavity tray 458, coffee placement cavity 451, and coffee slurry space 454 of the method and the apparatus for high yield foaming of coffee of the present invention, more particularly showing the resonance cavity 425.

In FIG. 7, the coffee bag 8 is placed over the coffee placement cavity 451 and the coffee slurry is vigorously oscillated as it passes through the resonance cavity 425 between the resonance needle 42 and the colloid ring 43, resonating the coffee slurry into an atomized bubble, producing a large amount of foam. According to the invention, through nearly one hundred tests, it is determined that the carbon dioxide gas pressure of the pressure control mechanism 2 after decompression is about 7 to be optimal; and the optimum geometry of the resonance cavity 425 between the resonance needle 42 and the colloid ring 43 is determined, where by the invention achieves unexpected technical effect that the coffee foaming rate changes by an "amount" beyond what the applicant expects.

In FIG. 8, a second outlet filter screen 54 provided at the coffee outlet 5 has a pocket shape, and a second splash-proof port 53 also has a pocket shape.

In addition to the second embodiment shown in FIG. 8, a number of different outlet filter screens, as well as forms of splash-proof ports, may be provided at the coffee outlet 5, which will not be exhaustive here.

The foregoing is merely preferred embodiments of the present invention, and alterations in the detailed description and scope of application will occur to those skilled in the art in light of the teachings of this invention and the description should not be construed as limiting the invention.

The invention claimed is:

1. An apparatus for high yield foaming of coffee, comprising a pressure control mechanism connected with a gas pressure source at an inlet of the pressure control mechanism and connected with a water reservoir at an outlet of the pressure control mechanism, a coffee placement cavity being arranged below the water reservoir, a back pressure resonance mechanism being arranged below the coffee placement cavity, and a coffee outlet being arranged at a lower part of the back pressure resonance mechanism, wherein the back pressure resonance mechanism comprises a guide plate with guide holes distributed on the guide plate circumferentially, with the guide holes communicated with an annular space, the back pressure resonance mechanism further comprising a back pressure cartridge, with a cartridge bottom surface of the back pressure cartridge pressed by a colloid ring;

one resonance needle being arranged on the cartridge bottom surface, a resonance groove being arranged at a contact position of the colloid ring with the resonance needle, the resonance groove being buckled on the resonance needle, with a resonance cavity constituted between the resonance groove and the resonance needle, when the coffee slurry having the brewing pressure passes through the resonance cavity, due to the brewing pressure and a special structure of the resonance cavity, the coffee slurry having the brewing pressure being sufficiently foamed after high-frequency oscillation and flowing out of the coffee outlet.

2. The apparatus for high yield foaming of coffee according to claim 1, wherein the pressure control mechanism is provided with a button, when the button is pressed down, the pressure control mechanism decompressing high-pressure gas to a gas having a brewing pressure which enters the water reservoir, water having the brewing pressure then entering the coffee placement cavity to be mixed with the coffee and extracted, the brewing pressure being 6-8 bar in a portable coffee maker and 9-11 bar in a domestic or desktop machine.

3. An apparatus for high yield foaming of coffee, comprising a pressure control mechanism connected with a gas pressure source at an inlet of the pressure control mechanism and connected with a water reservoir at an outlet of the pressure control mechanism, a coffee placement cavity being arranged below the water reservoir, a back pressure resonance mechanism being arranged below the coffee placement cavity, and a coffee outlet being arranged at a lower part of the back pressure resonance mechanism wherein:

when a guide plate is embedded into the back pressure cartridge, a guide plate periphery is matched with an upper inner circular wall of the back pressure cartridge;

a lower circular boss is arranged at a lower part of the guide plate and used for clamping a central circular hole of the colloid ring and positioning the colloid ring; and a lower inner circular wall of the back pressure cartridge and a colloid ring outer edge of the colloid ring together constitute an annular space.

4. An apparatus for high yield foaming of coffee, comprising a pressure control mechanism connected with a gas pressure source at an inlet of the pressure control mechanism and connected with a water reservoir at an outlet of the pressure control mechanism, a coffee placement cavity being arranged below the water reservoir, a back pressure resonance mechanism being arranged below the coffee placement cavity, and a coffee outlet being arranged at a lower part of the back pressure resonance mechanism wherein:

a lower part of the water reservoir is provided with a water reservoir lock catch which is buckled with a back pressure lock catch on a back pressure shell of the back pressure resonance mechanism, a coffee bag being locked on the coffee placement cavity;

the coffee placement cavity is supported by a placement cavity tray, and a coffee slurry space below the placement cavity tray stores the coffee slurry flowing down from a coffee slurry through hole, with an outlet filter screen and a splash-proof port arranged at the coffee outlet to enable the coffee slurry flowing out from a slurry outlet to sequentially flow into a coffee cup, a pressure control mechanism cover plate being arranged on top of the pressure control mechanism;

a back pressure cartridge sealing ring is arranged between the back pressure cartridge and the back pressure shell; and a guide plate filter screen is arranged on the guide plate.

5. The apparatus for high yield foaming of coffee according to claim 1, wherein the gas pressure source, the pressure control mechanism, and the water reservoir are combined and pressurized by a water pump, and pumped water enters the coffee placement cavity.

6. The apparatus for high yield foaming of coffee according to claim 3, wherein the pressure control mechanism is provided with a button, when the button is pressed down, the pressure control mechanism decompressing high-pressure gas to a gas having a brewing pressure which enters the water reservoir, water having the brewing pressure then entering the coffee placement cavity to be mixed with the coffee and extracted, the brewing pressure being 6-8 bar in a portable coffee maker and 9-11 bar in a domestic or desktop machine.

7. The apparatus for high yield foaming of coffee according to claim 3, wherein the gas pressure source, the pressure control mechanism, and the water reservoir are combined and pressurized by a water pump, and pumped water enters the coffee placement cavity.

8. The apparatus for high yield foaming of coffee according to claim 4, wherein the pressure control mechanism is provided with a button, when the button is pressed down, the pressure control mechanism decompressing high-pressure gas to a gas having a brewing pressure which enters the water reservoir, water having the brewing pressure then entering the coffee placement cavity to be mixed with the coffee and extracted, the brewing pressure being 6-8 bar in a portable coffee maker and 9-11 bar in a domestic or desktop machine.

9. The apparatus for high yield foaming of coffee according to claim 4, wherein the gas pressure source, the pressure control mechanism, and the water reservoir are combined and pressurized by a water pump, and pumped water enters the coffee placement cavity.

* * * * *